US006923536B2

(12) United States Patent
Huang

(10) Patent No.: US 6,923,536 B2
(45) Date of Patent: Aug. 2, 2005

(54) SPECTACLE STRAP-ON APPARATUS

(76) Inventor: Chung-Han Huang, P.O. Box No. 6-57, Junghe, Taipei 235 (TW)

( * ) Notice: Subject to any disclaimer, the term of this patent is extended or adjusted under 35 U.S.C. 154(b) by 0 days.

(21) Appl. No.: 10/701,512

(22) Filed: Nov. 6, 2003

(65) Prior Publication Data

US 2005/0099590 A1    May 12, 2005

(51) Int. Cl.[7] .............................................. G02C 9/00
(52) U.S. Cl. ......................................... 351/47; 351/57
(58) Field of Search .................................. 351/47, 57

(56) References Cited

U.S. PATENT DOCUMENTS

| | | | |
|---|---|---|---|
| 6,761,449 B1 * | 7/2004 | Xie | 351/57 |
| 6,783,233 B2 * | 8/2004 | Xie | 351/47 |

* cited by examiner

*Primary Examiner*—Huy Mai
(74) *Attorney, Agent, or Firm*—Troxell Law Office, PLLC

(57) ABSTRACT

A spectacle strap-on apparatus includes a pair of spectacles devised with a pair of lenses joined by a nose stand having two nose pads; and a pair of strap-on sunglasses. Wherein, the nose stand has auxiliary stands for connecting the two nose pads to the nose stand; and each auxiliary stand is provided with a fastening ring having a magnet inlaid at a center portion thereof. The strap-on sunglasses have a pair of lenses, and a nose stand connecting the two lenses. Wherein, the nose stand is fixed with a pair of fastening rings each having a magnet inlaid at a center portion thereof. Using the fastening rings of the strap-on sunglasses to adhere to the nose stand of the spectacles, the two magnets precisely come into contact with the two magnets at a rear portion of the nose stand of the spectacles, thereby firmly locating the strap-on sunglasses.

1 Claim, 4 Drawing Sheets

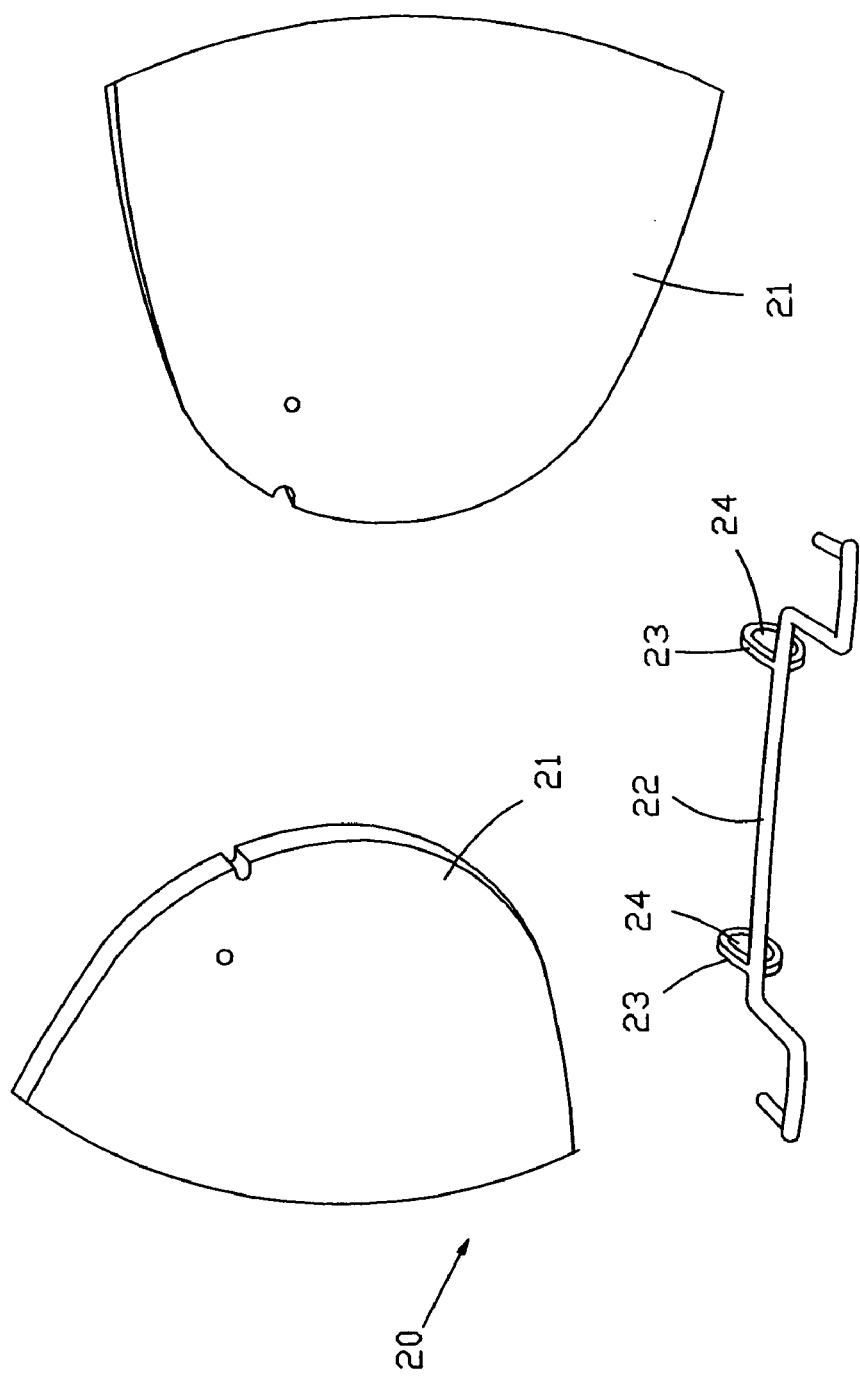

SPECTACLE STRAP-ON APPARATUS

BACKGROUND OF THE INVENTION (a) Field of the Invention

The invention relates to a spectacle strap-on apparatus, and more particularly, to a spectacle strap-on apparatus, which is devised by disposing magnets at nose pad auxiliary stands at a rear portion of a nose stand of a pair of spectacles, and a pair of magnets at corresponding positions at a nose stand of a pair of strap-on sunglasses, thereby adhering the strap-on sunglasses to an external side of the spectacles to form a pair of sunglasses. The sunglasses strap-on apparatus according to invention is a structure fully utilizing available spaces as well as providing simplified assemblies.

(b) Description of the Prior Art

Common conventional strap-on spectacles generally utilize principles of magnetism. At appropriate positions, an outer frame of a pair of spectacles is disposed with magnets. Meanwhile, at corresponding positions, a frame of a pair of strap-on sunglasses is also disposed with magnets. Thus, using principles of magnetism, the strap-on sunglasses become adhered at an external side of the spectacles, with a main characteristic thereof being that strap-on sunglasses having different colors can be replaced at all times as wished.

However, each magnet needs to be located at a fixed position, which can only be provided by frames of common spectacles. Thus, the aforesaid prior design is merely applicable to spectacles having frames but cannot be employed by frame-less spectacles.

Another shortcoming exists in the aforesaid conventional design. A frame having magnets has the magnets arranged on the frame during manufacturing process thereof, and the magnets cannot be disassembled or replaced. Therefore, the aforesaid design is more complicated regarding to manufacturing process thereof with high production costs. In addition, in cases of damages or malfunctions of the magnets, an only solution is to replace with another new pair of spectacles. Yet, common spectacle frames are not installed with magnets and strap-on sunglasses cannot be used. It is then necessary to replace the damaged or malfunctioning spectacles with another pair of spectacles having magnets in order to use the strap-on sunglasses. As a result, additional expenses are wasted and thus lacking market competitiveness.

SUMMARY OF THE INVENTION

In the view of the above, the invention provides a spectacle strap-on apparatus capable of effectively overcoming the aforesaid drawbacks.

The primary object of the invention is to provide a spectacle strap-on apparatus devised at nose auxiliary stands at a rear end of a nose stand. The spectacle strap-on apparatus is provided with magnets. At corresponding positions, a nose stand of a pair of strap-on sunglasses is also provided with a pair of magnets, so as to adhere the strap-on sunglasses to an external side of the spectacles to form a pair of sunglasses.

According to the aforesaid description of the invention, using the replaceable nose stands at the spectacles, the magnets are provided at unutilized spaces, so that the spectacles are offered with magnetism without requiring additional processing for lowering production costs.

In an embodiment according to the invention, a sunglasses strap-on apparatus comprises a pair of spectacles and a pair of strap-on sunglasses. The spectacles have a pair of lenses, a nose stand having two nose pads between the two lenses and for connecting the lenses, a seat fixed at an outer end of each lens, and an ear rack pivotally joined at an end of each seat. The nose stand has auxiliary stands that are located between and are for joining the two nose pads and the nose stand. Each of the auxiliary stands is disposed with a fastening ring having a magnet inlaid at a center portion thereof.

The pair of strap-on sunglasses has a pair of lenses connected by a nose stand in between. A rear portion of each two sides of the nose stand is disposed with a protruding fastening ring. Each of the two fastening rings is inlaid with a magnet.

Using the fastening rings of the strap-on sunglasses, the strap-on sunglasses are adhered to the nose stand of the spectacles, such that the magnets are exactly corresponded with the two magnets at the rear portion of the spectacle nose stand. The strap-on sunglasses are then steadily located using magnetism.

The other object of the invention is to provide a spectacle strap-on apparatus for devising a spectacle nose stand as a replaceable assembly. When necessary, the nose stand having magnets according to the invention may be replaced at all times instead of having to replace an entire pair of spectacles for conforming to economical considerations.

When the invention is applied in frame-less spectacles having a nose stand, for that the magnets are provided at the nose pad auxiliary stands at the rear portion of the nose stand, the magnets precisely come into contact with sides of the lenses in order to provide enhanced locating effects between the nose stand and the lenses.

When the invention is applied in spectacles having a frame and a replaceable nose stand, because the magnets are provided at the nose pad auxiliary stands at the rear portion of the nose stand, no additional magnet processing is needed at the spectacle frame, thereby lowering production costs of the spectacles having a frame.

BRIEF DESCRIPTION OF THE DRAWINGS

FIG. 2 shows an exploded view of the strap-on spectacle assemblies according to the invention, with relative positions of magnets at a nose stand indicated.

DETAILED DESCRIPTION OF THE PREFERRED EMBODIMENTS

To better understand the structures and characteristics of the invention, detailed descriptions shall be given with the accompanying drawings below.

Figure 1:
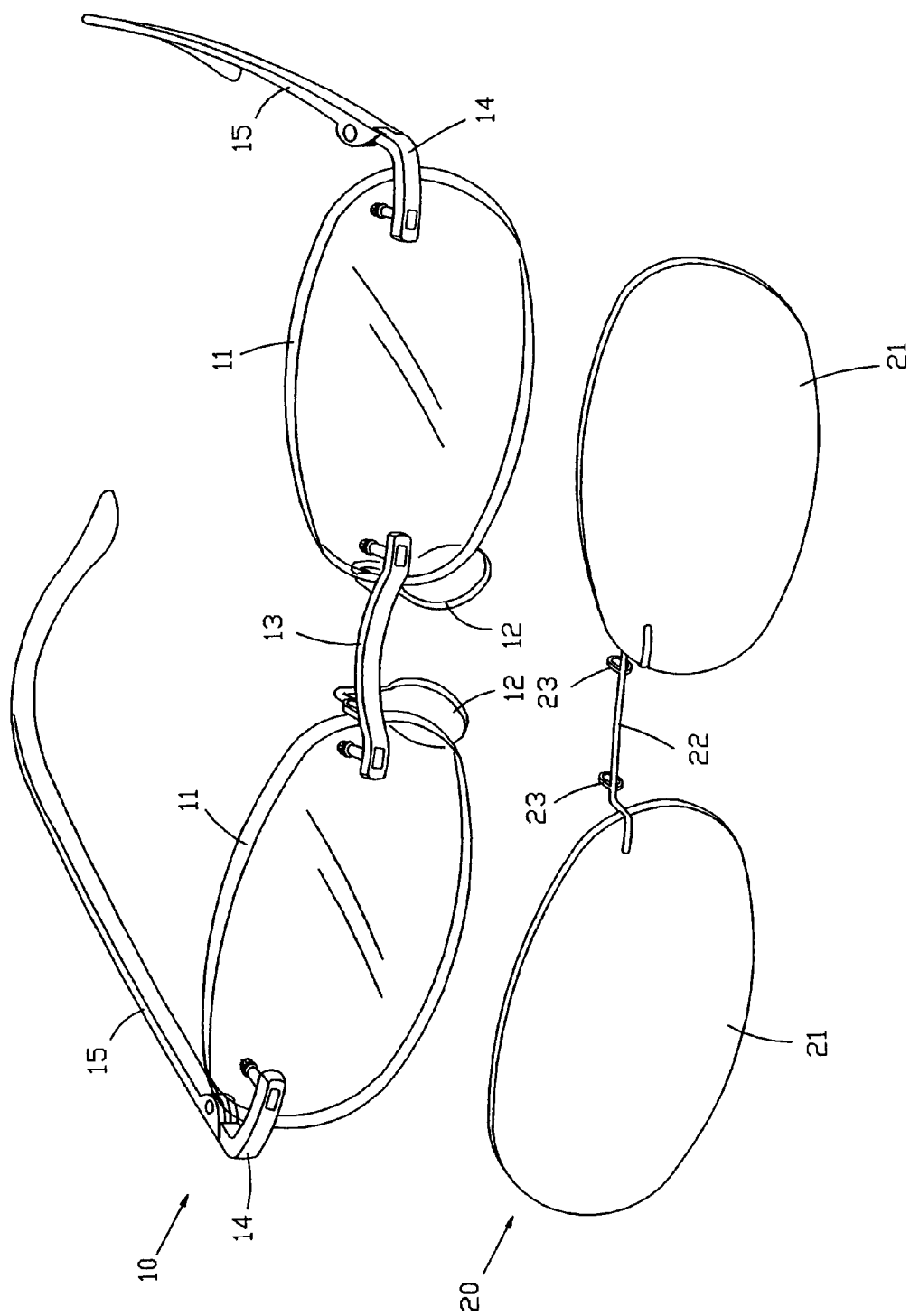
FIG. 1 shows a perspective view illustrating the strap-on not yet adhered to a pair of spectacles.

Referring to FIG. 1, a spectacle strap-on apparatus according to the invention comprises a pair of spectacles 10 and a pair of strap-on sunglasses 20. The strap-on apparatus is disposed at appropriate positions of nose stands of the spectacles 10 and the strap-on sunglasses 20, such that the strap-on sunglasses 20 become adhered to an external side of the spectacles 10 to form a pair of sunglasses.

With reference to FIG. 1, the aforesaid spectacles 10 have a pair of lenses 11, and a pair of nose pads 12 and a nose stand 13 that are fastened between the two lenses 11 and can be disassembled and assembled, a seat 14 fixed at an external side of each lens 11, and an ear rack 15 pivotally connected to an end of each seat 14.

Figure 3:
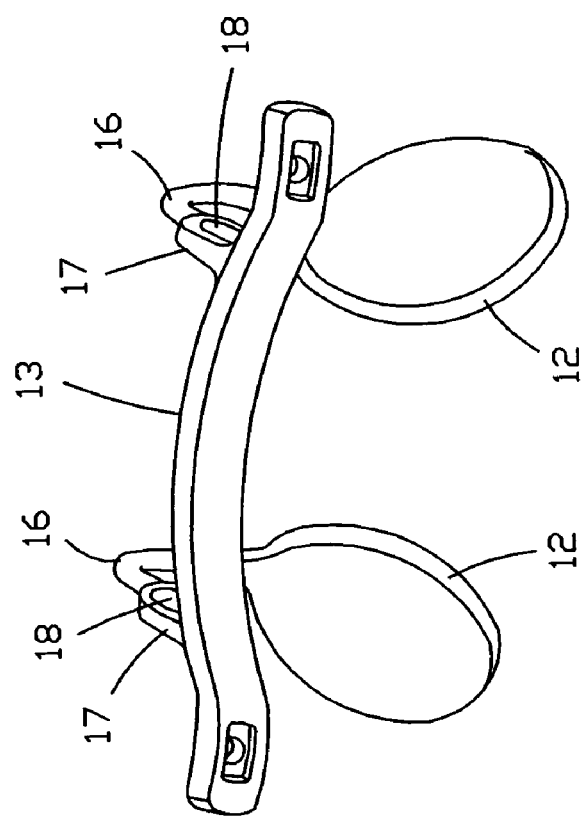
FIG. 3 shows an enlarge view of the spectacle nose stand according to the invention.

FIG. 3 shows an enlarge view of the aforesaid nose stand 13.

Figure 4:
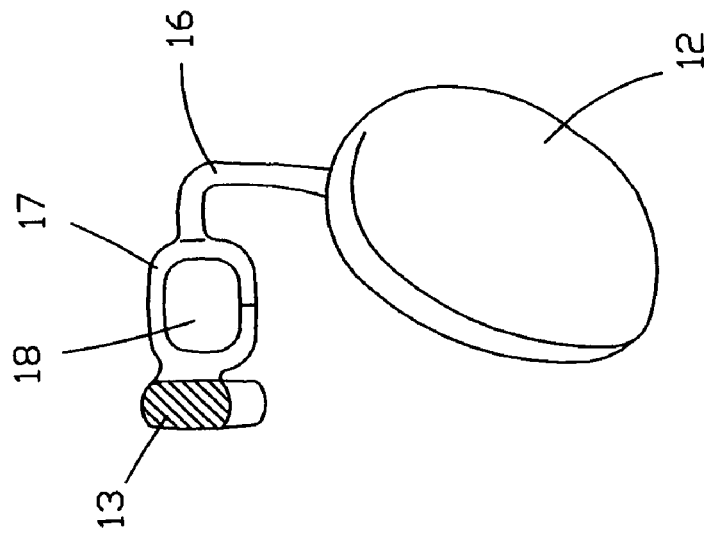
FIG. 4 shows a sectional side view of the spectacle nose stand according to the invention, with relative positions of the nose stand, frame and magnets indicated.

Referring to FIG. 3, the nose stand 13 has auxiliary stands 16 that are connected and located between the two nose pads 12 and the nose stand 13. Each of the two auxiliary stands 16 has a fastening ring 17 at a position near the nose stand 13. Each fastening ring 17 is inlaid with a magnet 18 at a center thereof. Referring to FIG. 4 showing a sectional side view of the nose stand 13, relative positions of the nose stand 13, the auxiliary stands 16, the fastening rings 17 and the magnets 18 are indicated.

Again referring to FIGS. 1 and 2, the aforesaid strap-on sunglasses 20 has a pair of lenses 21 connected by the nose stand 22 in between. A rear portion of each two sides of of the nose stand 22 is disposed with a protruding fastening ring 23. Each of the two fastening rings 23 is inlaid with a magnet 24.

Figure 5:
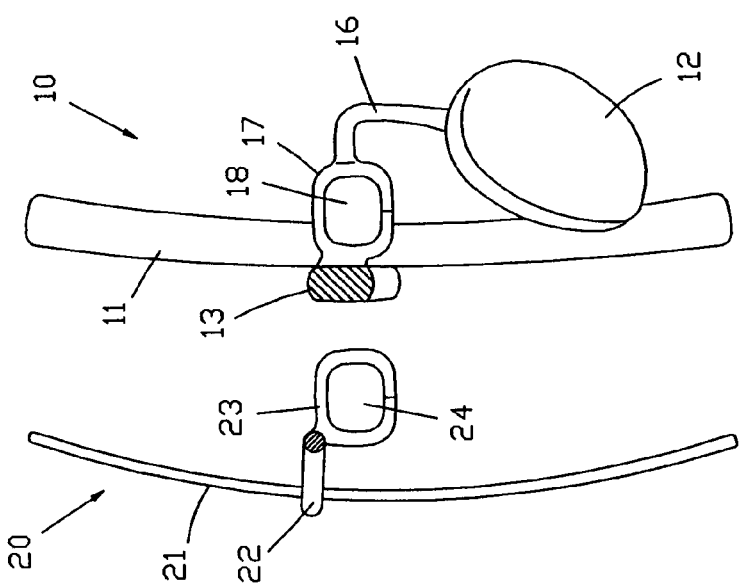
FIG. 5 shows a partial sectional side view illustrating the strap-on spectacles not yet adhered to the spectacles.

FIG. 5 shows a partial sectional side view according to the invention illustrating the strap-on sunglasses 20 not yet adhered to the spectacles 10.

Figure 7:
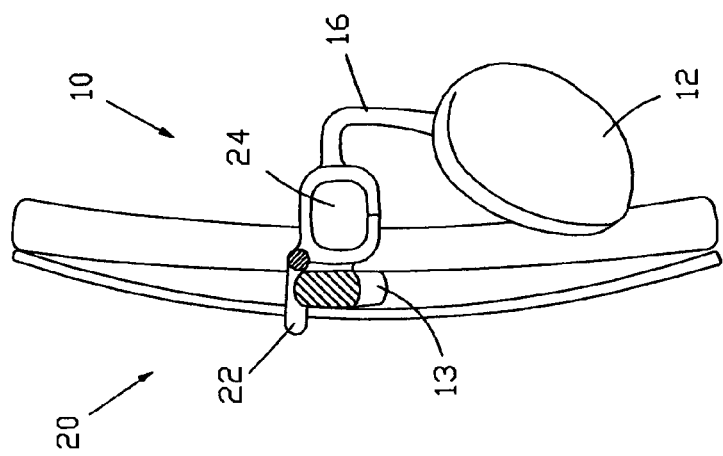
FIG. 7 shows continuous movements of FIG. 6 illustrating the strap-on spectacles already being adhered to the spectacles.
Figure 6:
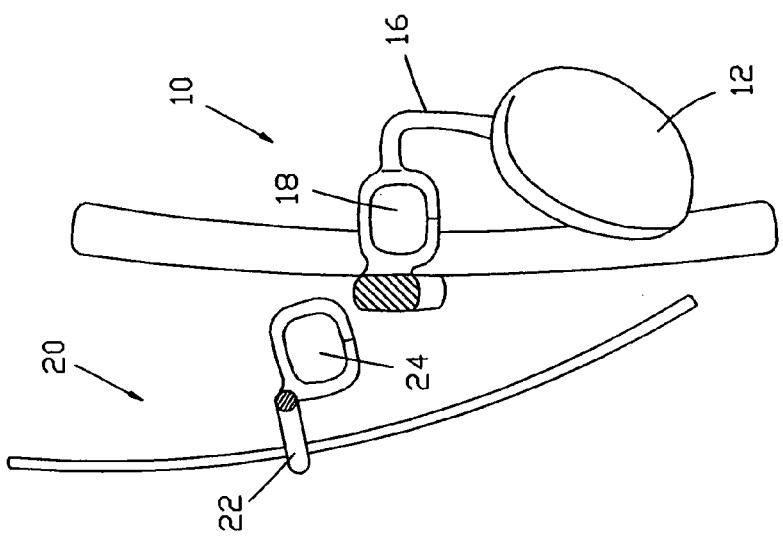
FIG. 6 shows continuous movements of FIG. 5.

As shown in FIGS. 1 and 5, the two magnets 18 disposed at the spectacle nose stand 13 and the two magnets 24 disposed at the strap-on sunglasses nose stand 22, are located at corresponding positions to each other. When the nose stand 22 of the strap-on sunglasses 20 is fastened at the nose stand 13 of the spectacles 10, with continuous movements as shown in FIGS. 5, 6 and 7, the two magnets 24 at the strap-on sunglasses nose stand 22 precisely come into contact with the magnets 18 at the auxiliary stand 16 and become closely adhered together. Thus, the strap-on sunglasses 20 are firmly positioned at the spectacles 10 to form a pair of sunglasses.

To replace with strap-on sunglasses 20 having different colors, the strap-on sunglasses 20 can be dismantled by following reverse actions shown in FIGS. 5, 6 and 7, and another pair of strap-on sunglasses 20 can be replaced.

The nose stand 13 of the spectacles 10 according to the invention is fixed between the two lenses 11, and can be disassembled and assembled. That is, the nose stand 13 is a replaceable assembly. For common spectacles without magnetic properties, instead of having to replace the entire spectacles, the spectacles can be provided with functions as being able to adhere to the strap-on sunglasses 20 by merely replacing with the nose stand 13 according to the invention.

In occurrences of magnet malfunctions, the nose stand 13 having magnets according to the invention can be replaced at all times without needing to replace the entire spectacles.

In addition, for that the magnets 18 are arranged at the nose pad auxiliary stands at the rear portion of the nose stand 13, limited available spaces of the spectacles are fully employed. The fastening rings 17 and the magnets 18 at the auxiliary stands 16 are exactly fastened to come into contact with sides of the lenses 11 as shown in FIG. 1. This design is similar to locating protruding rims of frame-less spectacles for coming into contact with lenses, so as to offer even firmer locating effects between the nose stand 13 and the lenses 11.

When the invention is applied to spectacles having a frame with replaceable a nose stand, because the magnets 18 are disposed at the nose pad auxiliary stands 16 at the rear portion of the nose stand, magnet processing of other portions of the spectacle frames is not required, thereby lowering production costs of the spectacles having a frame.

In simple descriptions, the invention devises the magnets 18 at the nose pad auxiliary stands 16 at the rear portion of the spectacle nose stand 13, and a pair of magnets 24 disposed at corresponding positions of the strap-on sunglasses nose stand 22. Thus, the strap-on sunglasses can be adhered to an external side of the spectacles to form a pair of sunglasses. Limited available spaces are fully used while simplifying the structure of the strap-on apparatus to offer economical and practical values.

It is of course to be understood that the embodiment described herein is merely illustrative of the principles of the invention and that a wide variety of modifications thereto maybe effected by persons skilled in the art without departing from the spirit and scope of the invention as set forth in the following claims.

What is claimed is:

1. A spectacle strap-on apparatus comprising:
   a) spectacles having:
      i) two spectacle lenses;
      ii) a first nose stand connected between the two spectacle lenses and having two spaced apart first fastening rings, two first magnets, two auxiliary stands, and two nose pads, the two spaced apart first fastening rings are connected directly to the first nose stand between the two spectacle lenses, each of the two first magnets is connected to one of the two spaced apart first fastening rings, each of the two auxiliary stands is connected at a first end thereof to one of the two spaced apart first fastening rings and at a second end thereof to one of the two nose pads, each of the two auxiliary stands being located between one of the two first magnets and one of the two nose pads;
      iii) two ear racks; and
      iv) two seats, each of the two seats connected at a first end thereof to an end of one of the two spectacle lenses opposite the nose stand and pivotally connected at a second end thereof to one of the two ear racks; and
   b) strap-on sunglasses being movable between connected and disconnected positions and having:
      i) two sunglass lenses; and
      ii) a second nose stand connected between the two sunglass lenses and having two spaced apart second fastening rings connected directly to the second nose stand between the two sunglass lenses and two second magnets, each of the two second magnets is connected to one of the two spaced apart second fastening rings,
      wherein, in the connected position, the second nose stand is positioned above the first nose stand and each of the two first magnets is connected to one of the two second magnets, and, in the disconnected position, the second nose stand is spaced apart from the first nose stand and each of the two first magnets is spaced apart from each of the two second magnets.

* * * * *